United States Patent
Grenier

[11] 3,907,251
[45] Sept. 23, 1975

[54] EXPANSIBLE PLUG VALVE
[76] Inventor: Wilfred J. Grenier, Central Tree Rd., Rutland, Mass. 01543
[22] Filed: Aug. 30, 1973
[21] Appl. No.: 392,967

[52] U.S. Cl. ............................. 251/189; 231/191
[51] Int. Cl.² ...................................... F16K 25/00
[58] Field of Search ............... 251/189, 191, 167

[56] References Cited
UNITED STATES PATENTS

| | | | |
|---|---|---|---|
| 2,290,251 | 7/1942 | Saunders | 251/167 |
| 2,552,991 | 5/1951 | McWhorter | 251/190 UX |
| 2,925,246 | 2/1960 | Sardeson | 251/191 |
| 3,612,479 | 10/1971 | Smith | 251/189 |
| 3,688,798 | 9/1972 | Nightingale | 251/189 |
| 3,747,479 | 7/1973 | Nightingale | 251/368 X |

*Primary Examiner*—Harold W. Weakley

[57] ABSTRACT

A valve comprising a resiliently expansible and compressible plug movable in a valve chamber to open and close a flow passage intersected by the chamber. The plug has a sealing portion which is expanded outwardly against the walls of the chamber, e.g., by being compressed in a different direction to maintain a fluid type seal when the plug is moved in a chamber between open and closed positions of the valve.

8 Claims, 23 Drawing Figures

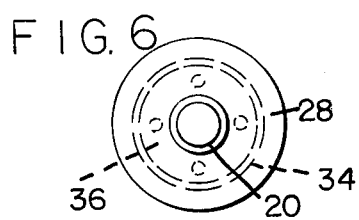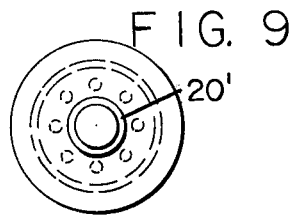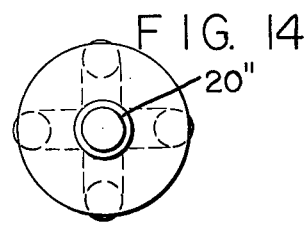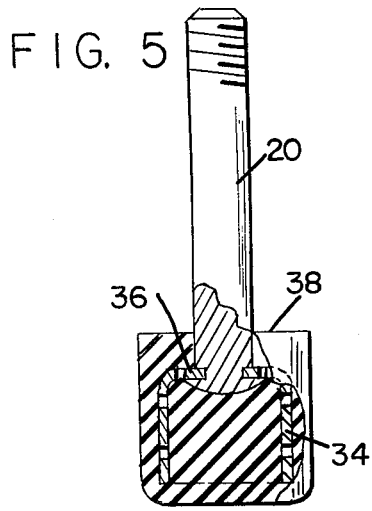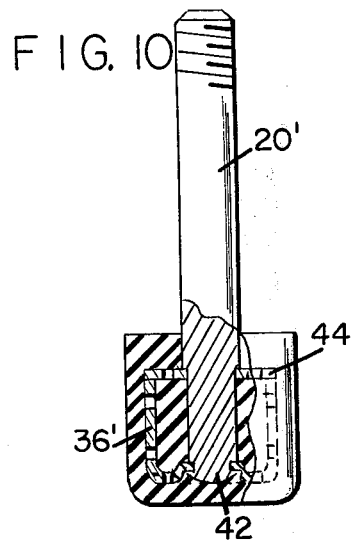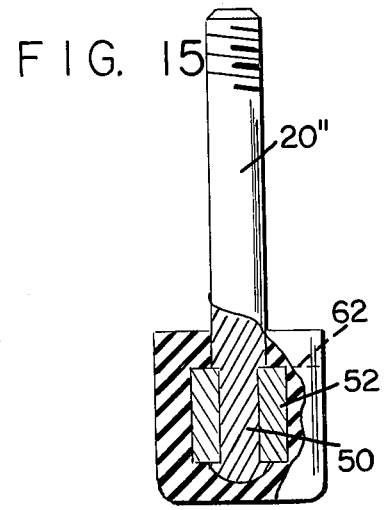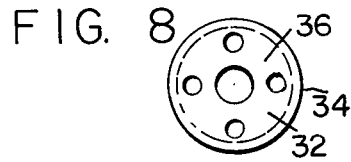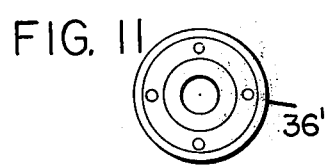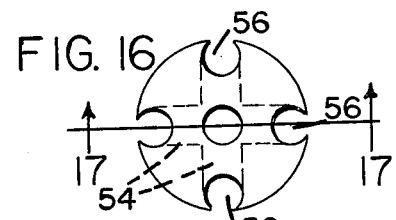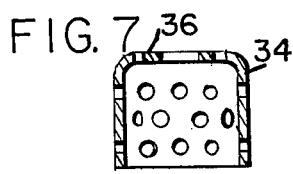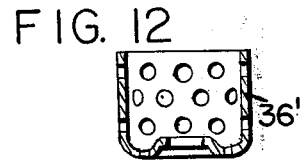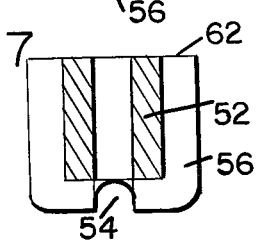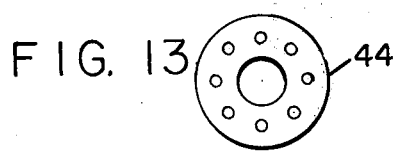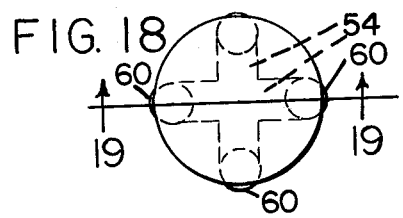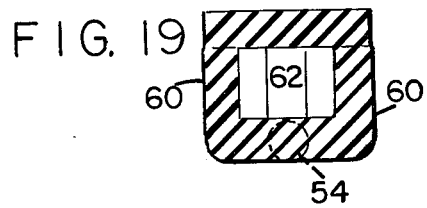

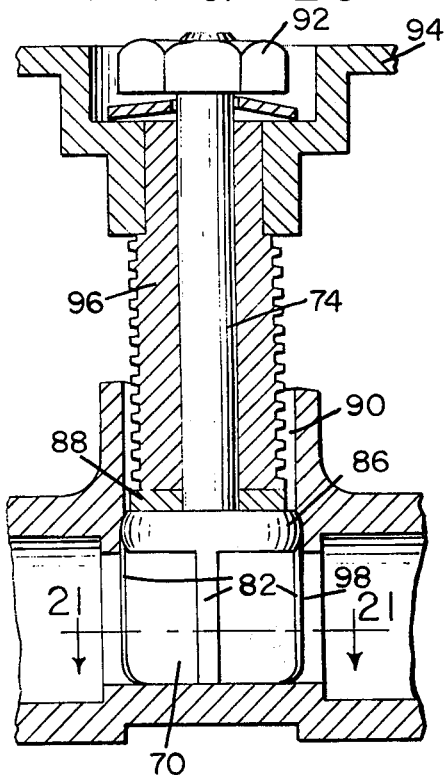
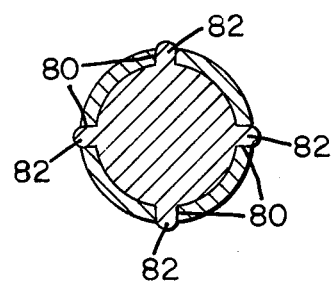
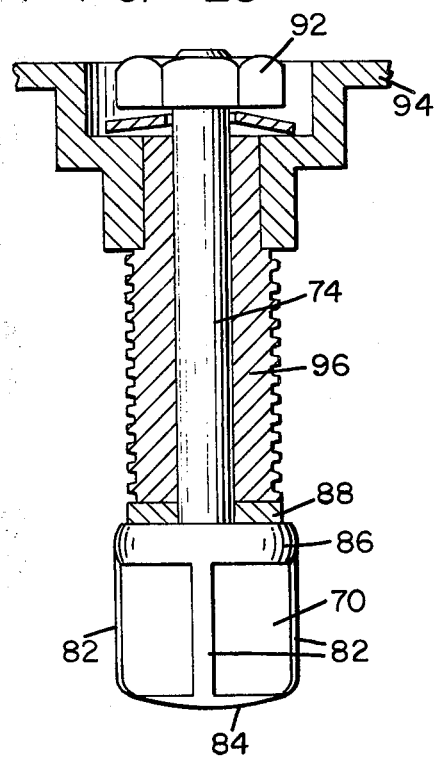
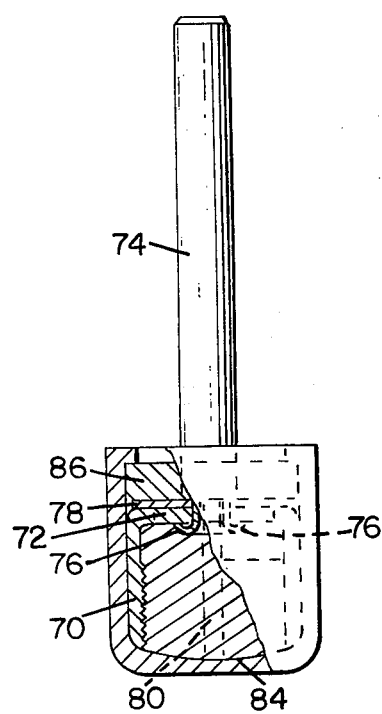

EXPANSIBLE PLUG VALVE

BACKGROUND OF THE INVENTION

Valves have been proposed for regulating fluid flow which utilize over-travel of a valve handle past that required to open or close the fluid passage so as to exert a compressive pressure on an expansible elastomeric plug in a manner expanding it outwardly against the surrounding walls for forming a seal. One of these valves is shown in U.S. Pat. No. 3,260,498. Although such valves are advantageous in eliminating gaskets, packings, and the like, they have drawbacks among which is the fact that such compressed expanded plugs extrude into the openings for the flow passage and thereby make it very difficult to open the valve and indeed in many instances destroy the plug by disrupting the material thereof as the parts of the plug that are extruded into the flow passage openings resist motion past the edges of the same and become sheared or fractured.

SUMMARY OF THE INVENTION

The object of the present invention is to provide an expansible elastomeric plug valve in which, when the compressive forces back off, the plug will relax sufficiently to allow it to be withdrawn from the flow passage easily for opening the valve without damage to the plug; and also the plug may be compressed in the opposite direction when the plug is seated in order to firmly seat the same and provide a leakproof function in the flow passage.

This is done by providing a valve elastomeric plug slidably movable transversely to the flow passage to open and close the flow passage, and including means for expanding it comprising first and second rigid elements confining a part only of the plug between them, one of the rigid elements being embedded in the plug and the other of the rigid elements being spaced from the first element axially along the stem which is connected to the first element, together with biasing means to urge the rigid members toward each other compressing the sealing portion of the plug between them so as to expand the sealing portion outwardly but only in one portion of the plug.

Also, motion of the embedded rigid element away from the second rigid element will compress and expand the plug in a different portion thereof to the end that the plug may be sealed in either open or shut condition thereof. Alternatively the plug may be sealed in the area of the flow passage by turning the biasing means in the opposite direction.

BRIEF DESCRIPTION OF THE DRAWINGS

FIG. 5 is a sectional view of one form of the plug;

FIG. 6 is a top plan view thereof;

FIG. 7 is a sectional view of the embedded element;

FIG. 8 is a top plan view thereof;

FIG. 9 is a top plan view of FIG. 8;

FIG. 10 is a view similar to FIG. 4 showing a modification;

FIG. 11 is a top plan view thereof;

FIG. 12 is a sectional view of a portion of the embedded member shown in FIG. 8;

FIG. 13 is a view illustrating a closure for the embedded member shown in FIG. 10;

FIG. 14 is a top plan view of FIG. 15;

FIG. 15 is a view similar to FIG. 4 illustrating a further modification;

FIG. 16 is a top plan view of the embedded member in the plug shown in FIG. 15;

FIG. 17 is a section on line 17—17 of FIG. 16;

FIG. 18 is a bottom plan view thereof;

FIG. 19 is a section on line 19—19 in FIG. 18 illustrating the elastomeric material therein;

FIG. 20 is a view similar to FIG. 1, showing a further modification with the valve closed;

FIG. 21 is a section on line 21—21 of FIG. 20;

FIG. 22 is a view of the valve of FIG. 20 illustrating its construction with a Teflon cover, and FIG. 23 shows the valve expanded.

PREFERRED EMBODIMENT OF THE INVENTION

Figure 1:
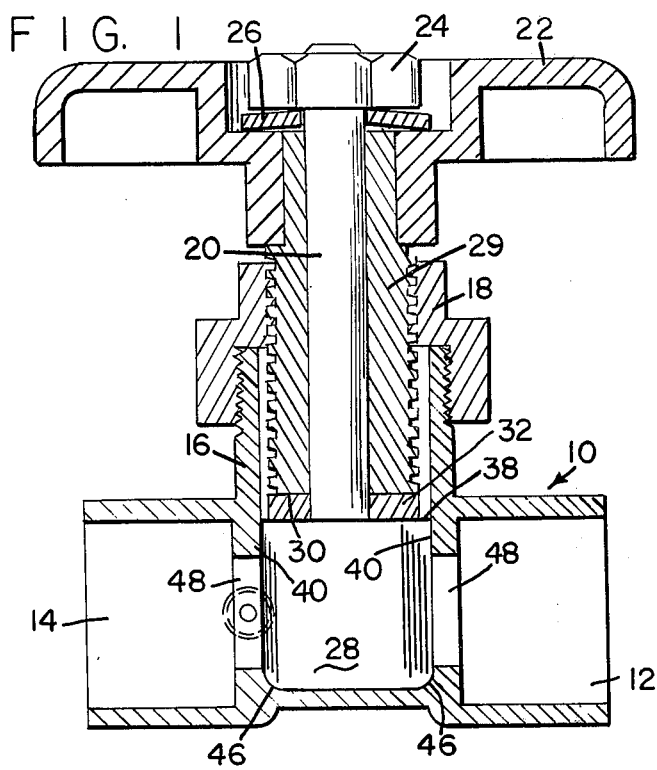
FIG. 1 is a vertical transverse section showing a valve embodying the present invention.
Figure 2:
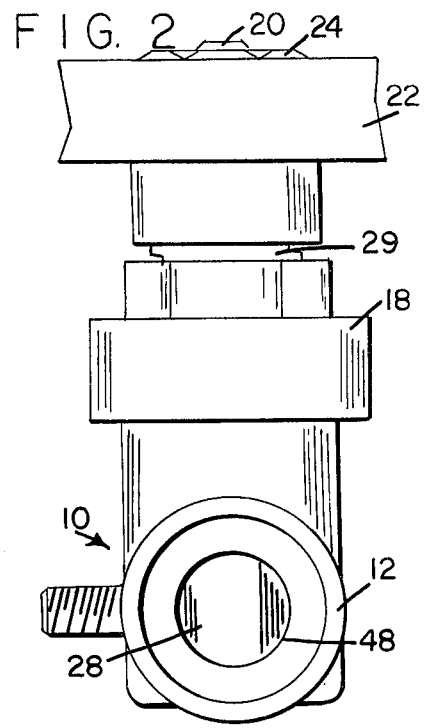
FIG. 2 is a view in elevation thereof.
Figure 3:
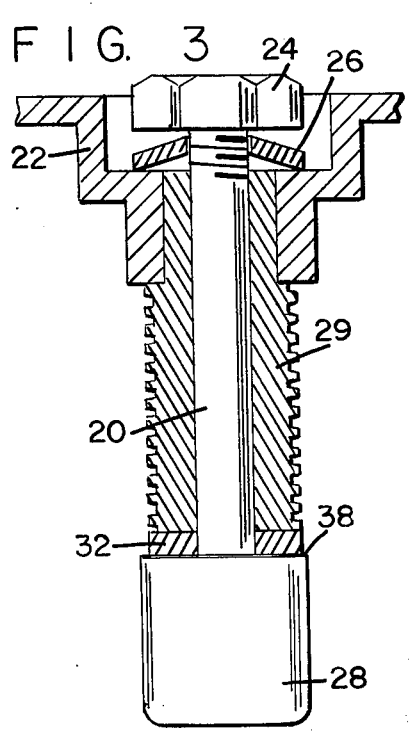
FIG. 3 is a sectional view illustrating the plug and its expanding means in relaxed condition.

Referring now to FIGS. 1 and 2 which show the general setup of the present invention, the reference character 10 indicates a valve housing having fittings at 12 and 14 for attachment to piping, etc., an externally upright threaded member 16 engaged with an internally threaded cap 18 and having a stem 20 therein. The stem 20 extends through a handle 22 and has a threaded end for a nut 24, there being a spring washer 26 under the nut.

The lower end of the stem 20 has attached thereto the elastomeric plug which in this case is shown as cylindrical and which is indicated at 28.

An externally threaded ferrule generally indicated at 29 is engaged with the cap 18 and forms an abutment at 30 for rigid washer member or the like 32 external of but abutting the plug 28.

Referring now to FIGS. 5 to 8 inclusive, the elastomeric plug 28 has embedded therein an inverted perforated cup 34. This cup has a perforated bottom 36 which is riveted to the lower end of the stem 20. The perforated bottom of the inverted cup is spaced from the upper flat surface 38 of the plug upon which lies the rigid washer 32, and it will be seen that these members are relatively close together as compared to the disclosure in the patented plug. The perforations enable the elastomeric material of the plug to be thoroughly embedded and mechanically connected with respect to the stem 20.

Figure 4:
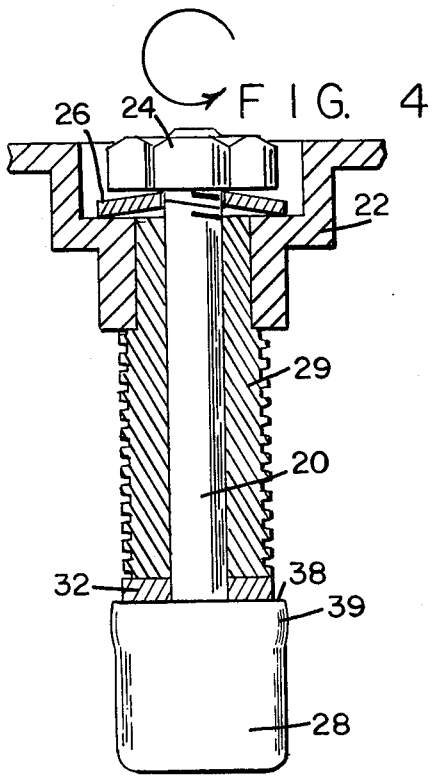
FIG. 4 is a view similar to FIG. 3 showing the same in expanded position in a certain area only thereof.

Upon turning the nut 24 in the direction of the arrow in FIG. 4 it will be seen that the plug 28 is expanded only in the area which is indicated at 39, FIG. 4. Thus when this is done with the plug in the position shown in FIG. 1, the bulge or extension 39 impinges firmly upon the interior wall at 40, 40 of the plug chamber, thereby completely sealing the stem area, etc. On the other hand, the plug can be withdrawn easily and is not sheared or worn in any way as would otherwise be the case were the plug to impinge upon the sharp edges defining the lower portion of the walls in the area of 40, 40, FIG. 1.

As a feature of this invention, the plug is expanded as described in the air before it is applied to the valve and in this way it can be adjusted with reasonable exactness in order to provide a plug which is sealing at all times whether it is open or closed or inbetween and which can be opened or closed easily by the handle 22 without the necessity of adjusting the amount of expansion of the plug in the area indicated at 39, FIG. 4, without changing the position of the nut.

Now referring to FIGS. 9 to 13 inclusive, there is shown a valve plug which is adapted to be used for higher pressure installations than the plug shown in FIG. 5, because the perforated insert 36' is in the form of an upright cup which is riveted to stem 20' at the lower end of the plug as at 42. This insert has a perforated closure plate at its upper end as at 44 and in this case it is seen that a completely enclosed basketlike member is utilized as the embedded member. In this case, stem 20' may be moved downwardly compressing the bottom of the plug in the area at the bottom of the plug chamber and expanding it in this area indicated at 46, 46 in FIG. 1, as well as in the area of the flow passages which are indicated at 48, 48, thus forming a seal against flow in either direction when the plug is firmly seated.

Referring to FIGS. 14 to 19 inclusive, there is shown a very high pressure installation. In this case the plug is considerably different than those described before, the stem 20'' having a semi-tubular rivet 50 which is a part of stem 20, which in turn secures insert 52 to stem 20, as best shown in FIG. 15. This insert has cross slots 54, 54 across the bottom and longitudinal side slots, preferably cylindrical, as at 56, 56.

In this case the slots 54 and 56 are filled with an elastomeric material which extends outwardly of the grooves as indicated in FIGS. 14 and 18 as at 60, 60. Thereby it will be seen that the elastomeric material will contact the plug chamber at all sides and at the bottom and the rigid washer 32, FIG. 1, on top, the latter being indicated as at 62, FIG. 15, but an equivalent to the internal flat surfaces 36' in FIG. 5, and 44' in FIG. 10.

In this case the action is substantially the same as above described but the fact is that the elastomeric material provides a seal at the bottom, in two directions, so that regardless of how the plug may be turned it will act as a bottom seal. The elastomeric material as at 60, 60 extends outwardly, engaging the side walls of the plug chamber and seals them against flow in either direction. At the same time the bulging of the material as at 39 in FIG. 4 is also accomplished by turning the nut 24'' in the proper direction.

FIGS. 20 to 23 illustrate a variation of the plug assembly shown in FIGS. 14 to 19. An inverted cup 70 has a base 72 which is connected to stem 74 by any desired means as at 76, and this connection includes a plate 78 exterior of the base 72. This cup is slotted longitudinally at a plurality of circumferentially spaced points 80 and is internally threaded.

This assembly has rubber or other elastomeric material molded into it forming a plug filling the cup, appearing through the slots 80 as at 82, FIG. 21, and including a domed bottom 84 and a solid top block 86. A washer 88 bears on the rubber block 86, and by means of stem 74 bearing causes the block 86 to expand into contact with the walls of well 90 in the valve housing, sealing the valve from leaking. This may be pre-set by nut 92.

The handle 94 causes the screw 96 to move up or down to open or close the valve. The valve is expanded in FIG. 23 so that the rubber 82 in the slots 80 retracts relative to the cup and the dome 84 is not under pressure. When the valve closes, FIG. 20, the dome 84 is under pressure and flattens out and the rubber at 82, 82 is pushed out into powerful contact with the valve body chamber wall at 98 along the plurality of lines defined by the rubber 82 and slots 80. This has the effect of completely sealing the valve at all sides, in a manner similar to the modification of FIGS. 14 to 19.

I claim:

1. A valve comprising a valve housing having a flow passage, a valve chamber extending transversely to, and intersecting said flow passage, a valve element movable in the chamber to open and close the flow passage, a stem for moving said valve element, said valve element comprising a metallic member including a side wall and means connecting the metallic element to said valve stem, means forming spaced longitudinal slots in said side wall, said slots extending generally transversely with respect to the flow passage, and elastomeric material in said metallic member, said elastomeric material in the open position of said valve normally filling said longitudinal slots, and extending exteriorly of said metallic member at the ends thereof opposite the stem and on the same side of the stem, whereby the exterior elastomeric material at the end opposite said stem contacts the bottom of the valve chamber when the valve element is moved to close the valve, exerting pressure thereon, and on the elastomeric material in the metallic member, said elastomeric material thereby being forced outwardly relative to said slots in contact with the walls of said valve chamber, and separate externally adjustable expanding means acting on the elastomeric material at the stem end thereof to continuously expand the elastomeric material into contact with the valve chamber wall and to seal the valve element against leaking in the valve stem area.

2. The valve according to claim 1 wherein said valve chamber and said side wall are cylindrical.

3. The valve according to claim 2 wherein said metallic member is an inverted cylindrical cup including said cylindrical side wall and an integral base connected to said valve stem, said longitudinal slots extending through said cylindrical side wall, and said elastomeric material in the open position of said valve normally filling said cup and bulging outwardly to fill said slots.

4. The valve according to claim 3 wherein said slots are generally straight.

5. The valve according to claim 4 wherein said slots are generally parallel to said valve stem.

6. The valve according to claim 2 wherein said slots extend radially inwardly from the outer surface of said cylindrical side wall for a distance substantially less than the thickness of the side wall.

7. The valve according to claim 6 wherein said longitudinal slots are generally cylindrical.

8. The valve according to claim 7 wherein said metallic member has a plurality of cross slots across the end thereof opposite said stem, said cross slots connecting opposite pairs of said longitudinal slots, and said elastomeric material at the end opposite said stem filling said cross slots.

* * * * *